US012651444B2

(12) United States Patent
Li

(10) Patent No.: US 12,651,444 B2
(45) Date of Patent: Jun. 9, 2026

(54) VIDEO CO-SHOOTING METHOD, APPARATUS, ELECTRONIC DEVICE AND COMPUTER-READABLE MEDIUM

(71) Applicant: Beijing Bytedance Network Technology Co., Ltd., Beijing (CN)

(72) Inventor: Cheng Li, Beijing (CN)

(73) Assignee: BEIJING BYTEDANCE NETWORK TECHNOLOGY CO, LTD., Beijing (CN)

( * ) Notice: Subject to any disclaimer, the term of this patent is extended or adjusted under 35 U.S.C. 154(b) by 0 days.

(21) Appl. No.: 18/397,743

(22) Filed: Dec. 27, 2023

(65) Prior Publication Data

US 2024/0161480 A1 May 16, 2024

Related U.S. Application Data

(63) Continuation of application No. 18/063,538, filed on Dec. 8, 2022, now Pat. No. 11,875,556, which is a
(Continued)

(30) Foreign Application Priority Data

Jun. 12, 2020 (CN) .......................... 202010537842.6

(51) Int. Cl.
  *G06V 10/80* (2022.01)
  *G06F 3/06* (2006.01)
  (Continued)

(52) U.S. Cl.
  CPC .............. *G06V 10/806* (2022.01); *G06F 3/06* (2013.01); *G06F 3/16* (2013.01); *G06T 7/194* (2017.01); *G06V 10/761* (2022.01)

(58) Field of Classification Search
  CPC ...... G06V 10/806; G06V 10/761; G06F 3/06; G06F 3/16; G06T 7/194; H04N 5/265;
  (Continued)

(56) References Cited

U.S. PATENT DOCUMENTS

| 8,698,874 B2 * | 4/2014 | Watson .................... H04N 7/15 |
| | | 709/201 |
| 9,652,828 B1 * | 5/2017 | Sabripour .............. H04N 7/181 |

(Continued)

FOREIGN PATENT DOCUMENTS

| CN | 108900902 A | 11/2018 |
| CN | 108989691 A | 12/2018 |

(Continued)

OTHER PUBLICATIONS

Office Action for European Patent Application No. 21822752.8, mailed Jul. 4, 2024, 4 pages.
(Continued)

*Primary Examiner* — Mia M Thomas
(74) *Attorney, Agent, or Firm* — Astute IP Law Group

(57) ABSTRACT

A video co-shooting method, an apparatus, an electronic device, and a computer-readable medium are provided, which involve the field of video processing technology. The method includes: receiving a co-shooting request input by a user based on a first video; in response to the co-shooting request, turning on a video capture apparatus, and acquiring a second video through the video capture apparatus; and fusing the first video with the second video to obtain a target video. In the embodiments of the present disclosure, a video capture apparatus is turned on according to a co-shooting request input by a user based on a first video, a second video is acquired through the video capture apparatus, and the first video is fused with the second video, so as to obtain a target video.

15 Claims, 5 Drawing Sheets

Related U.S. Application Data continuation of application No. PCT/CN2021/099121, filed on Jun. 9, 2021.

(51) Int. Cl.

| | | |
|---|---|---|
| *G06F 3/16* | (2006.01) | |
| *G06T 7/194* | (2017.01) | |
| *G06V 10/74* | (2022.01) | |

(58) Field of Classification Search

CPC ...... H04N 23/60; H04N 5/2624; H04N 23/64; H04N 23/951

See application file for complete search history.

(56) References Cited

U.S. PATENT DOCUMENTS

| | | | | |
|---|---|---|---|---|
| 10,289,914 | B2 * | 5/2019 | Chen | H04N 23/64 |
| 2015/0062283 | A1 * | 3/2015 | Mintz | H04N 7/141 |
| | | | | 348/14.07 |
| 2016/0248989 | A1 * | 8/2016 | Cross | H04N 21/2385 |
| 2017/0126968 | A1 * | 5/2017 | Somanath | H04N 13/15 |
| 2017/0180653 | A1 * | 6/2017 | Kang | H04N 23/62 |
| 2017/0230576 | A1 * | 8/2017 | Sparks | H04N 23/64 |
| 2017/0316270 | A1 * | 11/2017 | Chen | G06T 7/194 |
| 2018/0233175 | A1 * | 8/2018 | Nir | G06V 20/49 |
| 2020/0051527 | A1 | 2/2020 | Ngo | |
| 2021/0067676 | A1 | 3/2021 | Wen et al. | |
| 2021/0192214 | A1 | 6/2021 | Jiang et al. | |
| 2021/0224512 | A1 | 7/2021 | Zhai et al. | |
| 2022/0007074 | A1 | 1/2022 | Liu | |
| 2022/0068313 | A1 * | 3/2022 | Shafir Nir | G06V 20/48 |
| 2022/0215647 | A1 | 7/2022 | Yu et al. | |
| 2022/0332415 | A1 | 10/2022 | Lu et al. | |
| 2022/0377252 | A1 | 11/2022 | Li et al. | |
| 2023/0083896 | A1 | 3/2023 | Tu et al. | |
| 2023/0104764 | A1 * | 4/2023 | Li | G06V 10/806 |
| | | | | 382/190 |
| 2023/0128505 | A1 | 4/2023 | Lyu et al. | |
| 2023/0129871 | A1 | 4/2023 | Ma et al. | |
| 2023/0139723 | A1 * | 5/2023 | Thiel | G06T 13/40 |
| | | | | 715/757 |
| 2024/0137398 | A1 * | 4/2024 | Springer | H04N 23/698 |

FOREIGN PATENT DOCUMENTS

| | | | |
|---|---|---|---|
| CN | 108989692 | A | 12/2018 |
| CN | 110290425 | A | 9/2019 |
| CN | 110913244 | A | 3/2020 |
| CN | 111105350 | A | 5/2020 |
| CN | 111629151 | A | 9/2020 |
| CN | 113225483 | A | 8/2021 |
| CN | 115379105 | A | 11/2022 |
| EP | 3200444 | A1 | 8/2017 |
| IN | 553933 | | 11/2024 |
| JP | 2005223513 | A | 8/2005 |
| JP | 2010193155 | A | 9/2010 |
| JP | 2011029947 | A | 2/2011 |
| JP | 2016116117 | A | 6/2016 |
| KR | 1020090097431 | A | 9/2009 |
| KR | 1020160133246 | A | 11/2016 |
| WO | 2016039835 | A1 | 3/2016 |
| WO | 2017143392 | A1 | 8/2017 |
| WO | 2019112663 | A1 | 6/2019 |
| WO | 2019163558 | A1 | 8/2019 |
| WO | 2021249428 | A1 | 12/2021 |
| WO | 2022001593 | A1 | 1/2022 |
| WO | 2022161006 | A1 | 8/2022 |
| WO | 2022242497 | A1 | 11/2022 |
| WO | 2023024983 | A1 | 3/2023 |

OTHER PUBLICATIONS

Office Action for Japanese Patent Application No. 2022-575908, mailed Aug. 6, 2024, 6 pages.

Clevonen, R., "Your Brand Needs a Storyteller," CNPeReading, Apr. 30, 2018, pp. 176.

Extended European Search Report in EP21822752.8, mailed Sep. 25, 2023, 7 pages.

Yan, Z., "Photography Skills Tutorial, 8th Edition," Shanghai Fudan University Press, Jan. 23, 2018, pp. 301.

Hearing Notice for Indian Patent Application No. 202227070906, mailed Oct. 1, 2024, 2 pages.

Written Decision on Registration for Korean Application No. 10-2022-7043503, mailed on Oct. 29, 2024, 9 pages.

Feng Rui et al.; The Constrution of Learning Social Networking Sites in the Perspective Connectionism; Journal of Distance Education; Issue 3; Apr. 18, 2013, 7 pages, (English Abstract on p. 7).

International Search Report and Written Opinion for International Application No. PCT/CN2021/099121, mailed on Sep. 7, 2021, 19 Pages.

Decision to Grant a Patent for Japanese Patent Application No. 2022-575908, mailed on Nov. 4, 2025, 5 pages.

\* cited by examiner

VIDEO CO-SHOOTING METHOD, APPARATUS, ELECTRONIC DEVICE AND COMPUTER-READABLE MEDIUM

CROSS REFERENCE TO RELATED APPLICATIONS

This application is a continuation of U.S. application Ser. No. 18/063,538, filed on Dec. 8, 2022, which is a continuation of International Patent Application No. PCT/CN2021/099121, filed on Jun. 9, 2021, which claims the priority to and benefits of China Patent application No. 202010537842.6, filed on Jun. 12, 2020. All the aforementioned patent applications are hereby incorporated by reference in their entirety.

TECHNICAL FIELD

The present disclosure relates to a video co-shooting method, an apparatus, an electronic device, and a computer-readable medium.

BACKGROUND

With development of network technologies, videos can be posted on many social applications. Nowadays, it has become a trend for users to socialize by posting videos.

SUMMARY

At least one embodiment of the present disclosure provides a video co-shooting method, and the method comprises:

receiving a co-shooting request input by a user based on a first video;

in response to the co-shooting request, turning on a video capture apparatus, and acquiring a second video through the video capture apparatus; and fusing the first video with the second video to obtain a target video, where a foreground of the target video comes from one of the first video and the second video, and a background of the target video comes from another of the first video and the second video.

At least one embodiment of the present disclosure provides a video co-shooting apparatus, and the apparatus comprises:

a co-shooting request receiving module, configured to receive a co-shooting request input by a user based on a first video;

a video acquiring module, configured to turn on, in response to the co-shooting request, a video capture apparatus, and acquire a second video through the video capture apparatus; and a video fusing module, configured to fuse the first video with the second video to obtain a target video, where a foreground of the target video comes from one of the first video and the second video, and a background of the target video comes from another of the first video and the second video.

At least one embodiment of the present disclosure provides an electronic device, and the electronic device comprises:

one or more processors;

a memory; and one or more application programs, where the one or more application programs are stored in the memory and configured to be executed by the one or more processors, and the one or more application programs are configured to execute the video co-shooting method described above.

At least one embodiment of the present disclosure provides a computer-readable medium, and the computer-readable medium stores at least one instruction, at least one program, a code set, or an instruction set. The at least one instruction, the at least one program, the code set, or the instruction set is loaded and executed by a processor to implement the video co-shooting method described above.

BRIEF DESCRIPTION OF THE DRAWINGS

In order to clarify more clearly the technical solution in the embodiments of the present disclosure, the accompanying drawings used in the description of the embodiments of the present disclosure are briefly described below.

Figure 1:
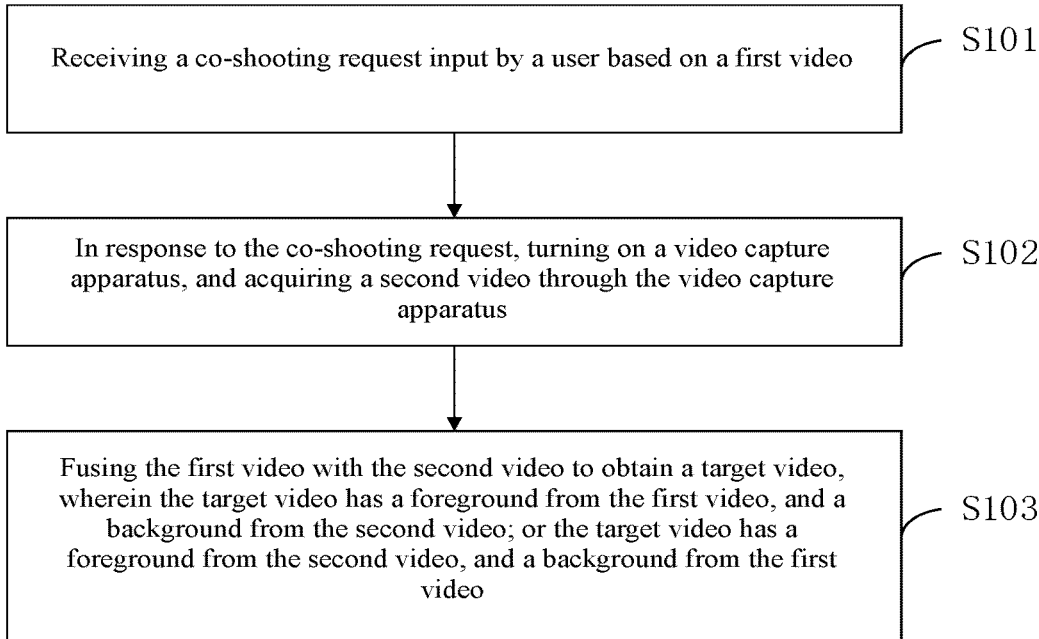
FIG. 1 is a schematic flow chart of a video co-shooting method provided by an embodiment of the present disclosure.

The above and other features, advantages and aspects of various embodiments of the present disclosure will become more apparent when taken in conjunction with the accompanying drawings and with reference to the following detailed implements. Throughout the drawings, the same or similar reference numbers refer to the same or similar elements. It should be understood that the drawings are schematic and that the components and elements are not necessarily drawn to scale.

DETAILED DESCRIPTION

Embodiments of the present disclosure will be described in more detail below with reference to the accompanying drawings. Although certain embodiments of the present disclosure are shown in the accompanying drawings, it should be understood that the present disclosure may be implemented in various forms, and should not be interpreted as limited to the embodiments set forth herein. Instead, these embodiments are provided for a more thorough and complete understanding of the present disclosure. It should be understood that the accompanying drawings and the embodiments of the present disclosure are only for illustrative purposes, and are not intended to limit the protection scope of the present disclosure.

It should be understood that various steps described in the method implementations of the present disclosure may be executed in different orders and/or in parallel. Further, the method implementations may include additional steps and/or omit execution of the steps shown. The scope of the present disclosure will not be limited in this regard.

The term "including" and variants thereof used herein are open including, that is, "including but not limited to". The term "based on" is "at least partially based on". The term "one embodiment" represents "at least one embodiment". The term "another embodiment" represents "at least one other embodiment". The term "some embodiments" means "at least some embodiments". Relevant definitions of other terms will be given in the following descriptions.

It should be noted that concepts such as "first", "second" and the like as mentioned in the present disclosure are only used to distinguish apparatuses, modules or units, but not to define that these apparatuses, modules or units must be different apparatuses, modules or units, nor to define the orders or interdependence of the functions executed by these apparatuses, modules or units.

It should be noted that the modifications "one" and "a plurality of" as mentioned in the present disclosure are exemplary rather than restrictive. Those skilled in the art should understand that, unless otherwise specified in the context, it should be understood as "one or more".

The names of messages or information interacted between a plurality of apparatuses according to the implementations of the present disclosure are only used for illustrative purposes, and are not used to limit the scope of these messages or information.

The technical solution of the present disclosure and how the technical solution of the present disclosure solves the above-described technical problems will be described in detail below with specific embodiments. The following specific embodiments may be combined with each other, and same or similar concepts or processes may not be repeated in some embodiments. The embodiments of the present disclosure will be described below in combination with the accompanying drawings.

Among the existing technologies for social communication through videos, there is a co-shooting technology. A user may display his/her video and another person's video on a same screen to achieve an interactive effect. However, in the existing co-shooting technology, the user's video and another person's video can only be displayed left and right in split screen, or up and down in split screen, etc. Interaction between the user and the original video is poor, there is a gap between the video shot by the user and the original video, the videos are obviously separated, and the interaction effect is poor.

It can be seen that in the existing co-shooting technology, there are problems such as poor interaction between the user and the original video, gap between the video shot by the user and the original video, obvious separation between the videos, and poor interaction effect.

In the embodiments of the present disclosure, a video capture apparatus is turned on according to a co-shooting request input by a user based on a first video, a second video is acquired through the video capture apparatus, and the first video is fused with the second video, so as to obtain a target video. After the first video is fused with the second video, there is no sense of separation between the two videos. The user captures the video by using a video co-shooting method provided by the embodiments of the present disclosure, which can enhance interaction between the user and the videos and increase fun of shooting. In the embodiments of the present disclosure, the term "co-shooting" and the term "capturing" may be used interchangeably, both of which means capturing contents from videos. In the embodiments of the present disclosure, when capturing videos, two or more users may capture separately, and then the video will be fused to achieve the effect of co-shooting videos.

An embodiment of the present disclosure provides a video co-shooting method, and as illustrated in FIG. 1, the method includes:

step S101: receiving a co-shooting request input by a user based on a first video;

step S102: in response to the co-shooting request, turning on a video capture apparatus, and acquiring a second video through the video capture apparatus; and step S103: fusing the first video with the second video to obtain a target video.

The video co-shooting method provided by the embodiments of the present disclosure may be applied to any terminal devices; the terminal device may be a terminal device having a video capture apparatus, such as a smart phone, a tablet computer, etc.; and when the terminal device does not have a video capture apparatus, it may be externally connected with a video capture apparatus. In the embodiments of the present disclosure, the video capture apparatus is turned on through the co-shooting request input by the user based on the first video, the second video is acquired through the video capture apparatus, and the first video is fused with the second video, so as to obtain the target video after the two video contents are fused. After the first video and the second video are fused, there is no sense of separation between the two videos, and the user captures the video by using the video co-shooting method provided by the embodiments of the present disclosure, which may enhance interaction between the user and the videos and increase fun of shooting.

The steps of the above-described video co-shooting method are described in detail below.

In step S101, the co-shooting request input by the user based on the first video is received.

In the embodiments of the present disclosure, taking that the solution is applied to an application (APP) as an example, the first video is a video uploaded and posted by a certain user in the APP. When a current user sees the video on the APP, the current user may initiate co-shooting based on the video.

With respect to the embodiments of the present disclosure, taking the above-described implementation as an example, when the current user watches a certain video and wants to take a co-shoot with the video, the current user may input a co-shooting request based on the video. A mode of inputting the co-shooting request may be triggering a co-shooting control of an APP interface, such as initiating a co-shooting request by clicking a co-shooting button of a video interface in the APP interface, or may also be initiating a co-shooting request by clicking a co-shooting forwarding button of the video. When the current user triggers the co-shooting control of the APP interface, the terminal device receives the co-shooting request.

In step S102, in response to the co-shooting request, the video capture apparatus is turned on, and the second video is acquired through the video capture apparatus.

In the embodiments of the present disclosure, the second video refers to a video captured by the current user based on the co-shooting request, in which the shooting object may be a person, a scene, etc.

With respect to the embodiments of the present disclosure, such as the above-described embodiments, an intelligent terminal to which the solution provided in the embodiments of the present disclosure is applied may include at least one video capture apparatus, such as a camera. After receiving the co-shooting request input by the user based on the first video, the terminal device, in response to the co-shooting request, turns on the video capture apparatus, and obtains the second video through the video capture apparatus.

In step S103, the first video and the second video are fused to obtain the target video. The target video has a foreground coming from the first video and a background coming from the second video; or the target video has a foreground coming from the second video and a background coming from the first video.

In the embodiments of the present disclosure, after acquiring the first video and the second video, the terminal device fuses the first video with the second video, to form the target video. The fusing mode may be fusing a portion of content of the first video with the second video, or fusing the whole content of the first video with the whole content of the second video, or fusing a portion of content of the first video with a portion of content of the second video, or fusing a portion of content of the second video with the whole content of the first video. The specific fusing mode is not limited in the embodiments of the present disclosure.

In the embodiments of the present disclosure, the video capture apparatus is turned on according to the co-shooting request input by the user based on the first video, the second video is acquired through the video capture apparatus, and the first video is fused with the second video to obtain the target video. After the first video and the second video are fused, there is no sense of separation between the two videos; and the user captures the video by using the video co-shooting method provided by the embodiments of the present disclosure, which may enhance interaction between the user and the videos and increase fun of shooting.

In the embodiments of the present disclosure, a possible implementation is provided, in which fusing the first video with the second video to obtain the target video includes at least one selected from a group consisting of:

extracting a first target content of the first video, and fusing the first target content with the second video to obtain the target video;

extracting a second target content of the second video, and fusing the second target content with the first video to obtain the target video; or extracting a third target content of the first video, extracting a fourth target content of the second video, and fusing the third target content with the fourth target content to obtain the target video.

In the embodiments of the present disclosure, the first target content may be a portion of the content of the first video, and the second target content may be a portion of the content of the second video. For example, the portion of the content is the background or the foreground of the video, or may also be one, some or all target objects in the video, for example, but not limited to, a person, etc. Optionally, the first target content and the second target content may be objects in corresponding videos, for example, persons, buildings, animals, etc. in the videos. The third target content may be the foreground or the background of the first video, and the fourth target content may be the foreground or the background of the second video; fusing the third target content with the fourth target content may be fusing the foreground of the first video with the background of the second video, or may also be fusing the foreground of the first video with the foreground of the second video, or may also be fusing the background of the first video with the foreground of the second video, or may also be fusing the background of the first video with the background of the second video; and the specific fusing mode is not limited in the embodiments of the present disclosure.

With respect to the embodiments of the present disclosure, there are many modes of fusing the first video with the second video. As one implementation of the embodiments of the present disclosure, when fusing the first video with the second video, the first target content of the first video is extracted, and then the first target content is fused with the second video to obtain the target video; specifically, the background of the first video may be taken as the first target content, then the background of the first video is taken as the background of the target video and is fused with the second video to obtain the target video. As another embodiment of the present disclosure, when fusing the first video with the second video, the second target content of the second video is extracted, and then the second target content is fused with the first video to obtain the target video; specifically, the foreground of the second video may be taken as the second target content, and then the foreground of the second video is taken as the foreground of the target video and is fused with the first video to obtain the target video.

In the embodiments of the present disclosure, the target contents of the first video and/or the second video are extracted, the extracted target contents are fused with the first video and/or the second video, and the contents of the first video and the second video are cross-fused to obtain the target video, so that there is no gap between the first video and the second video in the target video; and the first video and the second video are displayed through one video, which enhances interactive feeling of the user through video interaction.

The embodiments of the present disclosure provide a possible implementation, in which extracting the first target content of the first video and fusing the first target content with the second video includes:

in the case where the co-shooting request is a first co-shooting request, taking the first target content as the foreground of the target video, taking the second video as the background of the target video, and fusing the first target content with the second video.

In the embodiments of the present disclosure, there are many modes of fusing the first video with the second video. Different co-shooting modes may be selected according to the type of the co-shooting request input by the user. Here, the first co-shooting request refers to a co-shooting request to fuse the first target content of the first video with the second video; optionally, the first target content of the first video is the background of the first video, then the background of the first video may be taken as the background of the target video and may be fused with the second video, so as to obtain the target video.

Figure 2:
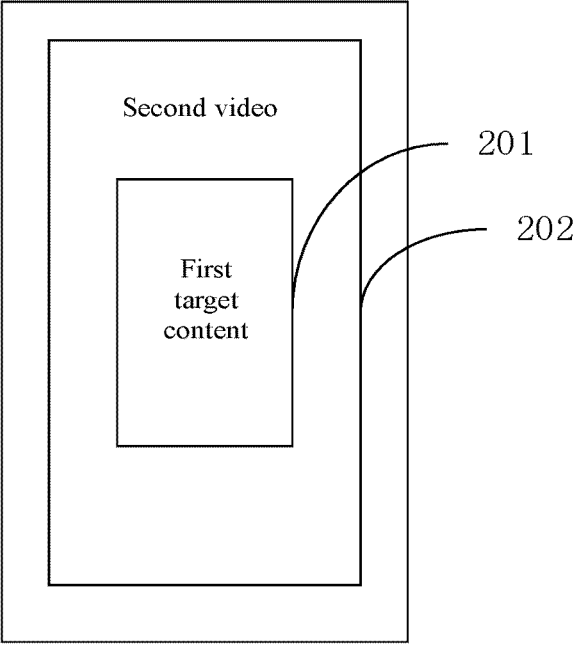
FIG. 2 is a schematic diagram of a target video provided by an embodiment of the present disclosure.

With respect to the embodiments of the present disclosure, in the case where the co-shooting request input by the user is the first co-shooting request, the first target content is taken as the foreground of the target video, the second video is taken as the background of the target video, and the first target content is fused with the second video. As one embodiment of the present disclosure, the first target content may be the foreground in the first video, or a person, a landscape, etc. of certain characters. After the first target content is extracted, as illustrated in FIG. 2, the first target content is taken as a foreground 201 of the target video, and the second video is taken as a background 202 of the target video for fusion, so as to obtain the target video. Specifically, for example, the first video is a live concert video of a singer; when extracting the first target content of the first video, the singer's body may be taken as the first target content; when fusing the first target content with the second video, the singer's body may be embedded into the foreground of the second video to obtain the target video; and a visual effect obtained is that the singer sings in the scene of the second video shot by the user.

In the embodiments of the present disclosure, the first target content of the first video may be embedded into the foreground of the second video, so that user may put the first target content of the first video into a video scene shot by himself/herself. There is no sense of separation between the first video and the second video, and interaction between the first video and the second video shot by the user is better.

The embodiments of the present disclosure further provide another possible implementation, in which extracting the second target content of the second video and fusing the second target content with the first video includes:

in the case where the co-shooting request is a second co-shooting request, taking the second target content as the foreground of the target video, taking the first video as the background of the target video, and fusing the second target content with the first video.

In the embodiments of the present disclosure, there are many modes of fusing the first video with the second video. Different co-shooting modes may be selected according to the type of the co-shooting request input by the user. Here, the second co-shooting request refers to a co-shooting request to fuse the first video with the second target content of the second video.

Figure 3:
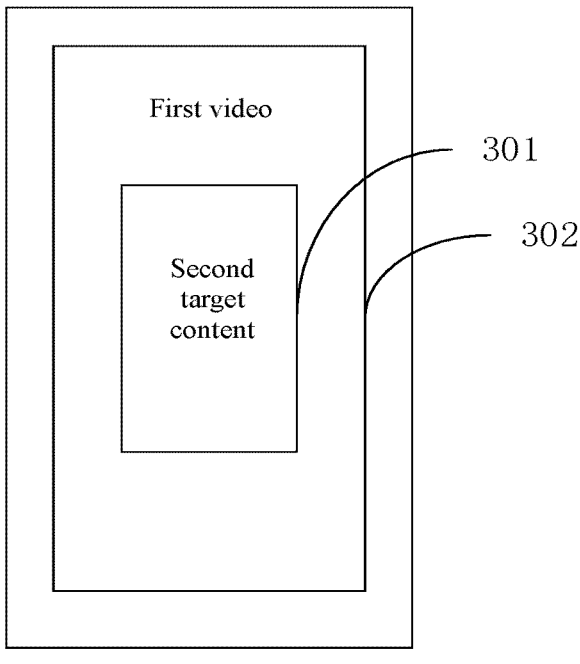
FIG. 3 is a schematic diagram of another target video provided by an embodiment of the present disclosure.

With respect to the embodiments of the present disclosure, in the case where the co-shooting request input by the user is the second co-shooting request, the second target content is taken as the foreground of the target video, the first video is taken as the background of the target video, and the second target content is fused with the first video. As an embodiment of the present disclosure, the second target content may be the foreground in the second video, or a person, a landscape, etc. of certain characters. After the second target content is extracted, as illustrated in FIG. 3, the second target content is taken as a foreground 301 of the target video, and the first video is taken as a background 302 of the target video for fusion, so as to obtain the target video. Specifically, for example, the first video is a live concert video of a singer, and the second video captured shows the user singing a song; when extracting the second target content of the second video, the user's body may be taken as the second target content; when fusing the second target content with the first video, the user's body may be embedded into the foreground of the first video to obtain the target video; and a visual effect obtained is that both the user and the singer sing songs on a same stage.

In the embodiments of the present disclosure, the second target content of the second video is embedded into the foreground of the first video, so that the user may put the second target content of the second video into the video scene of the first video. There is no sense of separation between the first video and the second video, and interaction between the first video and the second video shot by the user is better.

As another embodiment of the present disclosure, when the first video is fused with the second video, the first target content of the first video and the second target content of the second video may be selected for fusion. For example, the first target content is taken as the background, and the second target content is taken as the foreground for fusion; or the first target content is taken as the foreground, and the second target content is taken as the background for fusion, so as to obtain the target video; or target content extraction may not be performed on the first video and the second video, instead, one of the first video and the second video is directly taken as the background, and the other of the first video and the second video is taken as the foreground for fusion, so as to obtain the target video; and all the above-described solutions are within the protection scope of the present disclosure.

Figure 4:
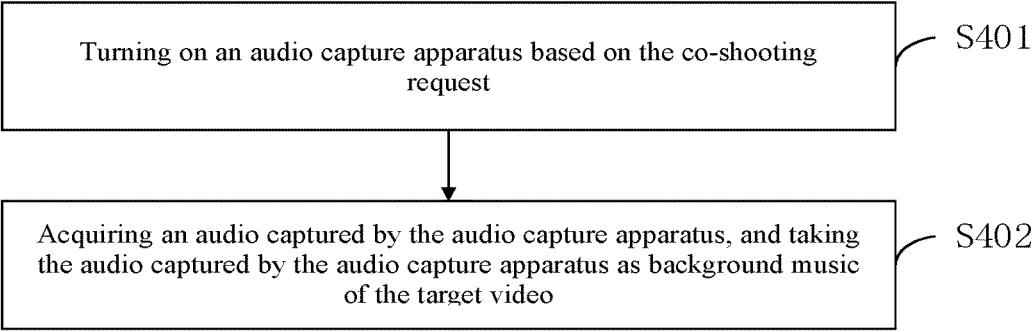
FIG. 4 is a schematic flow chart of a method for adding background music to a target video provided by an embodiment of the present disclosure.

The embodiments of the present disclosure further provide a possible implementation; and as illustrated in FIG. 4, in the implementation, the method further includes:

step S401: based on the co-shooting request, turning on an audio capture apparatus; and step S402: acquiring an audio captured by the audio capture apparatus, and taking the audio captured by the audio capture apparatus as background music of the target video.

In the embodiments of the present disclosure, the terminal device may be a terminal device having a built-in audio capture apparatus; in the case where the terminal device have no audio capture apparatus, it may be externally connected with an audio capture apparatus. The user may add background music to the target video through the terminal device. There are many modes of adding background music. As one of the implementations thereof, the audio capture apparatus is turned on while the user inputs a co-shooting request, and the audio captured by the audio capture apparatus is taken as the background music of the target video. Hereinafter, addition of background music is described in detail below.

In step S401, the audio capture apparatus is turned on based on the co-shooting request.

In the embodiments of the present disclosure, when the user inputs the co-shooting request based on the first video, the co-shooting request further includes a request for turning on an audio capture apparatus, and the audio capture apparatus may be a device such as a microphone. As an embodiment of the present disclosure, when the user clicks a control that initiates the co-shooting request, the user clicks a control that turns on the audio capture apparatus at a same time, and the terminal device turns on the audio capture apparatus based on this click; or the user may separately click the control that turns on the audio capture apparatus to turn on the audio capture apparatus.

In step S402, the audio captured by the audio capture apparatus is acquired, and the audio captured by the audio capture apparatus is taken as the background music of the target video.

In the embodiments of the present disclosure, after turning on the audio capture apparatus, the terminal device acquires the audio captured by the audio capture apparatus, and takes the audio as the background music of the target video. The audio captured by the audio capture apparatus is the background music of the second video.

In the embodiments of the present disclosure, the audio capture apparatus is turned on based on the co-shooting request input by the user, and the audio captured by the audio capture apparatus is taken as the background music of the target video, thereby increasing attractiveness of the target video.

Figure 5:
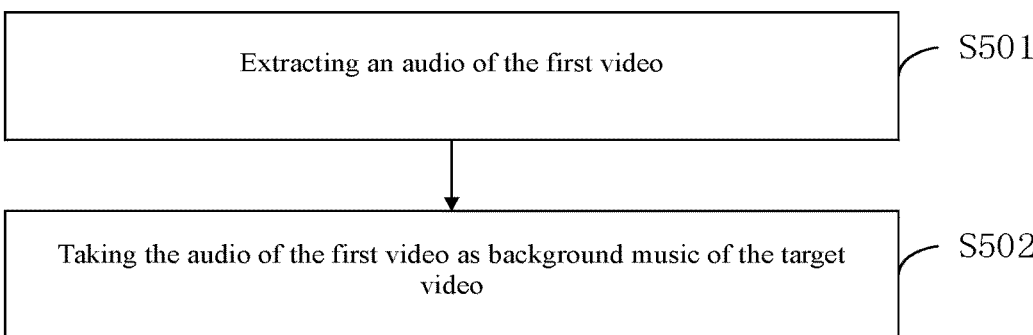
FIG. 5 is a schematic flow chart of another method for adding background music to a target video provided by an embodiment of the present disclosure.

The embodiments of the present disclosure provide another possible implementation; and as illustrated in FIG. 5, in the implementation, the method further includes:

step S501: extracting an audio of the first video; and step S502: taking the audio of the first video as the background music of the target video.

In the embodiments of the present disclosure, there are many modes of adding background music. In the previous embodiment, the background music of the second video is taken as the background music of the target video. In this embodiment, the background music of the first video may be taken as the background music of the target video. For example, when the current user wants to match a dance action he/she takes with the music rhythm of the first video, the user may choose to take the background music of the first video as the background music of the target video. A specific implementation is as follows.

In the embodiments of the present disclosure, if the user does not input an audio capture request when inputting the co-shooting request based on the first video, e.g., if the user does not click an audio capture control of the APP interface, but chooses to take the background music of the first video as the background music of the target video, the audio of the first video is extracted based on the co-shooting request of the user. Optionally, the audio of the first video may be taken as the background music of the target video after the audio of the first video is extracted and fusion of the first video and the second video is completed, or the audio of the first video may be taken as the background music of the target video in the process of capturing the second video or in the process of fusing the videos.

In the embodiments of the present disclosure, the background music of the first video is taken as the background music of the target video, and the target video shot by the user adopts same background music as the first video when the user performs co-shooting, which improves interactivity of the target video and the first video.

Figure 6:
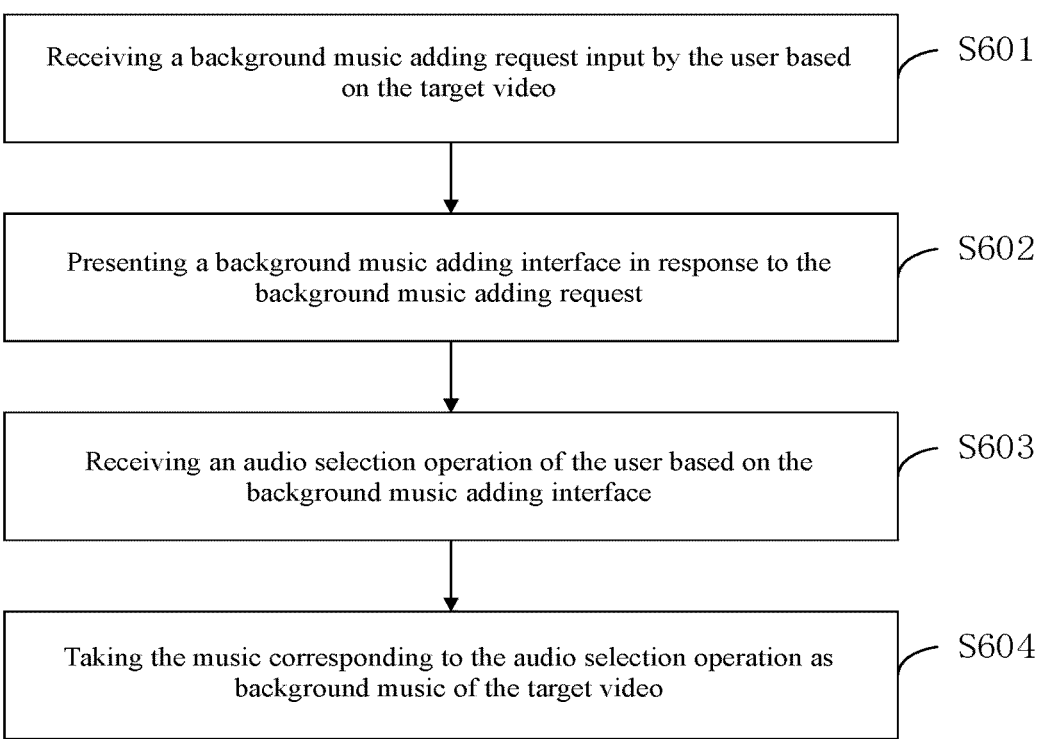
FIG. 6 is a schematic flow chart of still another method for adding background music to a target video provided by an embodiment of the present disclosure.

The embodiments of the present disclosure provide another possible implementation, as illustrated in FIG. 6, and in the implementation, the method further includes:

step S601: receiving a background music adding request input by the user based on the target video;

step S602: presenting a background music adding interface in response to the background music adding request;

step S603: receiving an audio selection operation of the user based on the background music adding interface; and step S604: taking the music corresponding to the audio selection operation as the background music of the target video.

In the embodiments of the present disclosure, there are many modes of adding background music to the target video. In the foregoing two embodiments, the background music of the first video and the background music of the second video are respectively taken as the background music of the target video. When the user does not want to use the background music of the first video and the second video, the user may choose to add background music he/she wants as the background music of the target video. Hereinafter, the solution is described in detail below.

In step S601, the background music adding request input by the user based on the target video is received.

In the embodiments of the present disclosure, when the user chooses to add music other than that of the first video and the second video as the background music of the target video, the user needs to input the background music adding request, so that the terminal device may add background music for the target video based on the background music adding request.

With respect to the embodiments of the present disclosure, the operation that the user input the background music adding request based on the target video may be that the user clicks a background music adding control on the APP interface, and the terminal device receives the background music adding request based on the operation.

In step S602, the background music adding interface is presented in response to the background music adding request.

Figure 7:
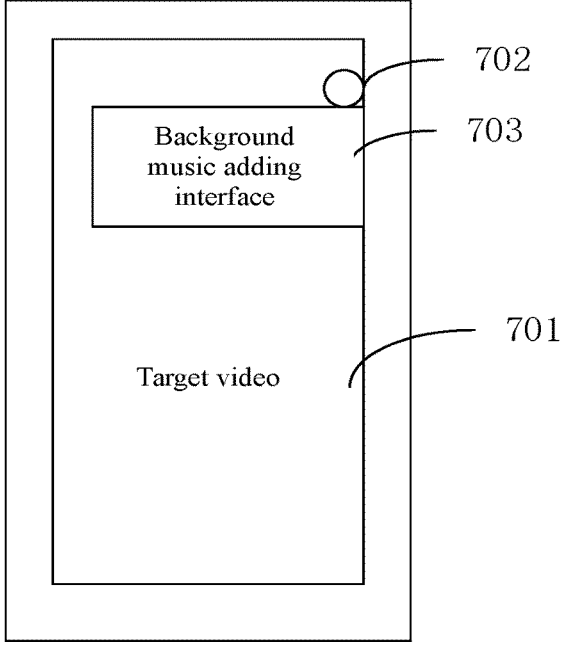
FIG. 7 is a schematic diagram of a background music adding interface provided by an embodiment of the present disclosure.

In the embodiments of the present disclosure, the terminal device presents the background music adding interface in response to the background music adding request, as illustrated in FIG. 7, the APP presentation interface includes a target video presentation region 701 and a background music adding control 702; when clicking the background music adding control 702, the background music adding interface 703 is presented, and the user may select background music to add the background music based on the background music adding interface.

In step S603, the audio selection operation by the user based on the background music adding interface is received.

In the embodiments of the present disclosure, the user may perform an audio selection operation on the background music adding interface displayed by the terminal device. The audio selection operation may be clicking an icon or a music name of the background music in the background music adding interface, so as to select the background music.

In step S604, the music corresponding to the audio selection operation is taken as the background music of the target video.

In the embodiments of the present disclosure, the device terminal takes the corresponding music as the background music of the target video based on the audio selection operation of the user. The music may be locally cached music or music downloaded from the network.

In the embodiments of the present disclosure, the background music adding request input by the user is received, the background music adding interface is presented based on the background music adding request, and the corresponding music is determined as the background music of the target video according to the background music addition operation of the user based on the background music adding interface, so that the user may add background music for the target video according to the user's own preference, resulting in better user experience.

Figure 8:
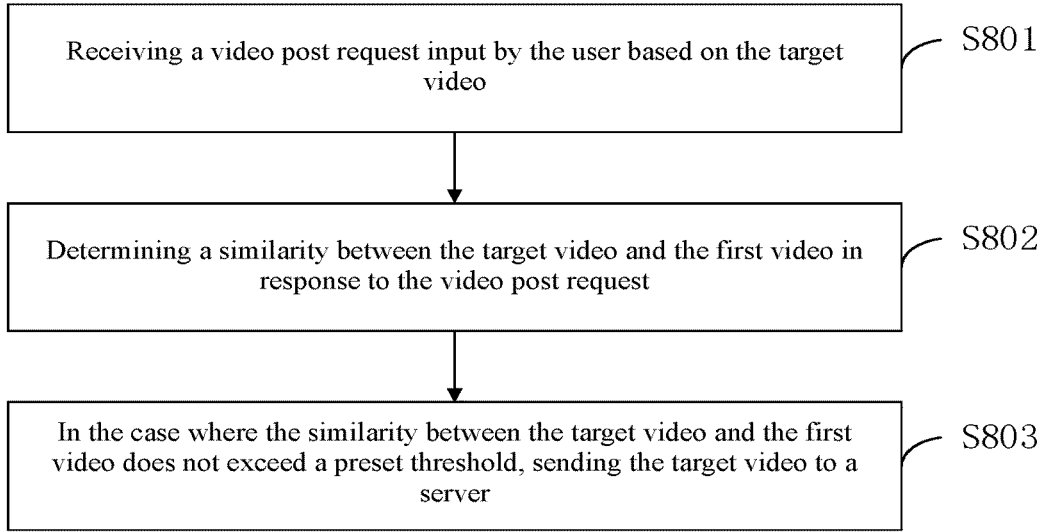
FIG. 8 is a flow chart of a video posting method provided by an embodiment of the present disclosure.

The embodiments of the present disclosure provide a possible implementation, as illustrated in FIG. 8, and in the implementation, the video co-shooting method further includes:

step S801: receiving a video post request input by the user based on the target video;

step S802: in response to the video post request, determining the similarity between the target video and the first video; and step S803: in the case where the similarity between the target video and the first video does not exceed a preset threshold, sending the target video to the server.

In the embodiments of the present disclosure, after the user completes video co-shooting, the user may choose to post the video. However, before posting the video, the user needs to check whether the video meets requirements for posting, that is, the similarity between the target video and the first video should not be too high, so as to prevent the user from directly stealing others' video for posting. Hereinafter, the above-described solution is described in detail below.

In step S801, the video post request input by the user based on the target video is received.

In the embodiments of the present disclosure, after video co-shooting is completed, the user may choose to post the target video. Optionally, the user may click a video posting control of the target video interface to initiate a video post request, and the terminal device receives the video post request input by the user based on the target video.

In step S802, the similarity between the target video and the first video is determined in response to the video post request.

In the embodiments of the present disclosure, the similarity between the target video and the first video may be calculated through a similarity algorithm, or may also be calculated by identifying whether a content not in the first video exists in the target video.

In step S803, in the case where the similarity between the target video and the first video does not exceed the preset threshold, the target video is sent to the server.

In the embodiments of the present disclosure, if the similarity between the target video and the first video does not exceed the preset threshold, it indicates that the target video is significantly different from the first video, and thus the target video may be sent to the server for posting, or when it is detected that a content not in the first video exists in the target video, it also indicates that the target video is significantly different from the first video, and thus the target video may be sent to the server for posting; or when it is detected that a content not in the first video exists in the target video and the content not in the first video occupies a duration of the target video that exceeds a preset percentage, it also indicates that the target video is significantly different from the first video, and thus the target video may be sent to the server for posting. The content not in the first video may be a person, an animal, a landscape, etc. For convenience of description, taking a specific application scenario as an example, the first video is a live concert video of a singer; if the current user wants to perform co-shooting based on the live concert video, i.e., co-shooting himself/herself into the live concert video, then, when an image of the current user is detected in the target video and the image of the current user exists in the target video for more than a preset duration, for example, 3 seconds, it is determined that the target video is significantly different from the first video, and the target video may be sent to the server for posting; if the image of the current user is not detected in the target video, or the image of the current user appears in the target video for less than 3 seconds, it is determined that the similarity between the target video and the first video is too high, and the target video cannot be posted. Optionally, when posting the target video, a co-shooting link may be automatically generated; the co-shooting link may include a homepage link of the author of the first video, so that other users may learn more about relevant works of the author of the first video, which also plays a certain role in promoting the author of the first video.

In the embodiments of the present disclosure, the similarity between the target video and the first video is calculated, and the target video is sent to the server for posting only when the similarity does not exceed the preset threshold, so as to prevent the user from directly copying other's videos to cause infringement.

In the embodiments of the present disclosure, the video capture apparatus is turned on according to the co-shooting request input by the user based on the first video, the second video is acquired through the video capture apparatus, and the first video is fused with the second video, so as to obtain the target video. After the first video and the second video are fused, portions or the whole contents of the two videos are fused, so there is no sense of separation between the two videos. The user captures videos by using the video co-shooting method provided by the embodiments of the present disclosure, which may enhance interaction between the user and the videos and increase fun of shooting.

Figure 9:
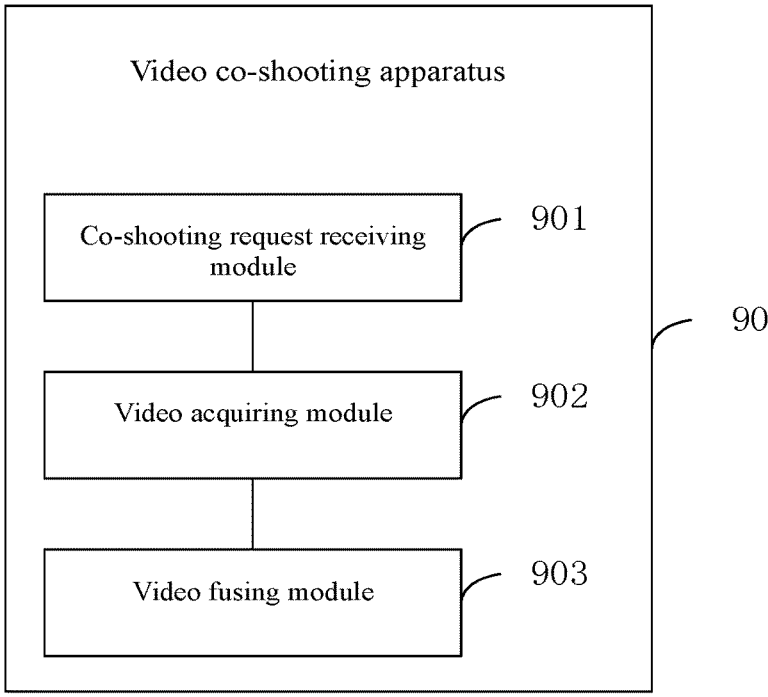
FIG. 9 is a structural schematic diagram of a video co-shooting apparatus provided by an embodiment of the present disclosure.

The embodiments of the present disclosure provide a video co-shooting apparatus, as illustrated in FIG. 9, a video co-shooting apparatus 90 may include: a co-shooting request receiving module 901, a video acquiring module 902, and a video fusing module 903.

The co-shooting request receiving module 901 is configured to receive a co-shooting request input by a user based on a first video.

The video acquiring module 902 is configured to turn on, in response to the co-shooting request, a video capture apparatus, and acquire a second video through the video capture apparatus.

The video fusing module 903 is configured to fuse the first video with the second video to obtain a target video. The target video has a foreground coming from the first video and a background coming from the second video; or the target video has a foreground coming from the second video and a background coming from the first video.

Optionally, when fusing the first video with the second video to obtain the target video, the video fusing module 903 may be configured to:

extract a first target content of the first video, and fuse the first target content with the second video to obtain the target video; and/or extract a second target content of the second video, and fuse the second target content with the first video to obtain the target video; and/or extract a third target content of the first video, extract a fourth target content of the second video, and fuse the third target content with the fourth target content to obtain the target video.

Optionally, when extracting the first target content of the first video, and fusing the first target content with the second video to obtain the target video, the video fusing module 903 may be configured to:

in the case where the co-shooting request is a first co-shooting request, take the first target content as the foreground of the target video, take the second video as the background of the target video, and fuse the first target content with the second video.

Optionally, when extracting the second target content of the second video, and fusing the second target content with the first video to obtain the target video, the video fusing module 903 may be configured to:

in the case where the co-shooting request is a second co-shooting request, take the second target content as the foreground of the target video, take the first video as the background of the target video, and fuse the second target content with the first video.

Optionally, the video fusing module 903 may be further configured to:

turn on, based on the co-shooting request, an audio capture apparatus; and acquire an audio captured by the audio capture apparatus, and use the audio captured by the audio capture apparatus as background music of the target video.

Optionally, the video fusing module 903 may be further configured to:

extract an audio of the first video; and take the audio of the first video as the background music of the target video.

Optionally, the video fusing module 903 may be further configured to:

receive a background music adding request input by the user based on the target video;

present a background music adding interface in response to the background music adding request;

receive an audio selection operation of the user based on the background music adding interface; and take the music corresponding to the audio selection operation as the background music of the target video.

Optionally, the video co-shooting apparatus provided by the embodiments of the present disclosure further includes a video posting module, which is configured to:

receive a video post request input by the user based on the target video;

determine, in response to the video post request, the similarity between the target video and the first video; and send, in the case where the similarity between the target video and the first video does not exceed a preset threshold, the target video to the server.

The above-described modules may be implemented as software components executed on one or more general-purpose processors, or as hardware such as programmable logic devices and/or application-specific integrated circuits, which execute certain functions or combinations thereof. In some embodiments, these modules may be embodied in a form of a software product, the software product may be stored in a nonvolatile storage medium, and the nonvolatile storage medium includes enabling a computing device (e.g., a personal computer, a server, a network device, a mobile terminal, etc.) to implement the methods as described in the embodiments of the present disclosure. In one embodiment, the above-described modules may be further implemented on a single device, or distributed on a plurality of devices. These modules may have functions combined with each other, or may also be further divided into a plurality of sub-modules.

The video co-shooting apparatus according to this embodiment may execute the video co-shooting method illustrated in the above-described embodiments of the present disclosure, implementation principles thereof are similar, and no details will be repeated here.

In the embodiments of the present disclosure, the video capture apparatus is turned on according to the co-shooting request input by the user based on the first video, the second video is acquired through the video capture apparatus, and the first video is fused with the second video, so as to obtain the target video. After the first video and the second video are fused, there is no sense of separation between the two videos; and the user captures videos through the video co-shooting method provided by the embodiments of the present disclosure, which may enhance interaction between the user and the videos and increase fun of shooting.

Figure 10:
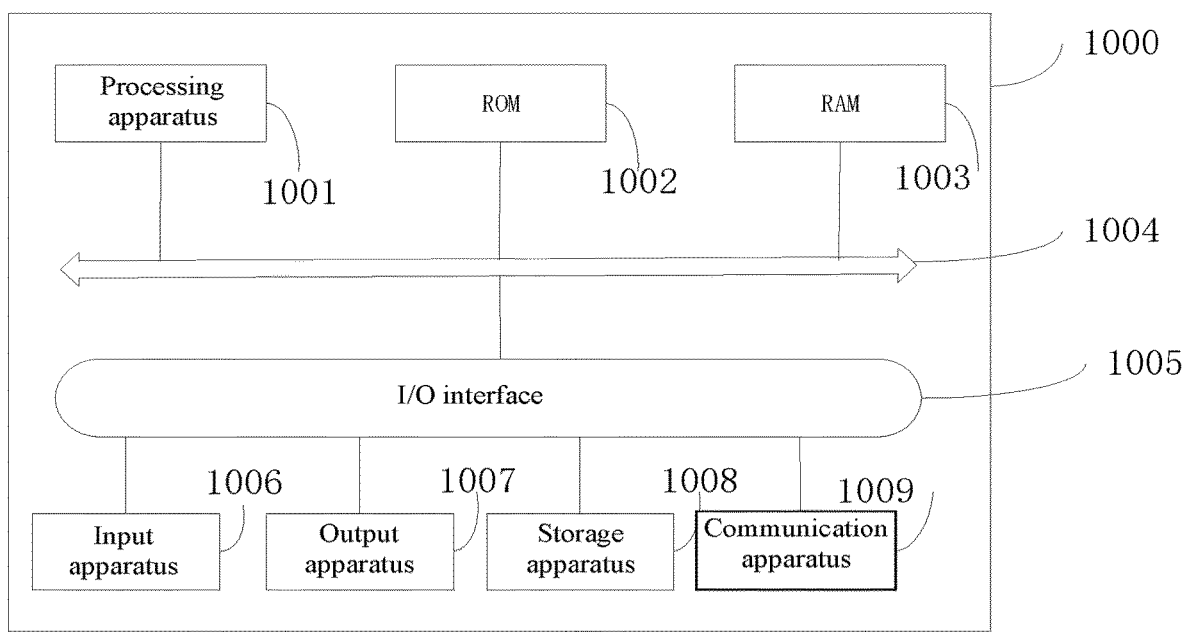
FIG. 10 is a structural schematic diagram of an electronic device provided by an embodiment of the present disclosure.

Referring to FIG. 10, it illustrates a structural schematic diagram of an electronic device suitable for implementing the embodiments of the present disclosure. The electronic device according to the embodiments of the present disclosure may include, but not limited to, a mobile terminal such as a mobile phone, a laptop, a digital broadcast receiver, a personal digital assistant (PDA), a tablet computer (PAD), a portable multimedia player (PMP), a vehicle-mounted terminal (e.g., a vehicle-mounted navigation terminal), etc., and a stationary terminal such as a digital TV, a desktop computer, etc. The electronic device illustrated in FIG. 10 is only an example, and should not impose any limitation on the function and use scope of the embodiments of the present disclosure.

The electronic device includes a memory and a processor. The processor here may be referred to as a processing apparatus 1001, and the memory may include at least one of a read-only memory (ROM) 1002, a random access memory (RAM) 1003, and a storage apparatus 1008, specifically as shown below.

As illustrated in FIG. 10, the electronic device 1000 may include a processing apparatus (also referred to as a "processor", for example, a central processing unit, a graphics processor, etc.) 1001, which may execute various appropriate actions and processing according to a program stored in a read-only memory (ROM) 1002 or a program loaded from a storage apparatus 1008 into a random access memory (RAM) 1003. The RAM 1003 further stores various programs and data required for operation of the electronic device 1000. The processing apparatus 1001, the ROM 1002, and the RAM 1003 are connected with each other through a bus 1004. An input/output (I/O) interface 1005 is also coupled to the bus 1004.

Usually, apparatuses below may be coupled to the I/O interface 1005: input apparatuses 1006 including, for example, a touch screen, a touch pad, a keyboard, a mouse, a camera, a microphone, an accelerometer, a gyroscope, etc.; output apparatuses 1007 including, for example, a liquid crystal display (LCD), a speaker, a vibrator, etc.; storage apparatuses 1008 including, for example, a magnetic tape, a hard disk, etc.; and a communication apparatus 1009. The communication apparatus 1009 may allow the electronic device 1000 to perform wireless or wired communication with other device so as to exchange data. Although FIG. 10 shows the electronic device 1000 having various apparatuses, it should be understood that, it is not required to implement or have all the apparatuses illustrated, and the electronic device 1000 may alternatively implement or have more or fewer apparatuses.

Particularly, according to the embodiments of the present disclosure, the flows described above referring to the flow charts may be implemented as computer software programs. For example, the embodiments of the present disclosure include a computer program product, which comprises a computer program carried on a nonvolatile computer-readable medium, the computer program contains program codes for executing the method illustrated in the flow chart. In such embodiments, the computer program may be downloaded and installed from the network via the communication apparatus 1009, or installed from the storage apparatus 1008, or installed from the ROM 1002. When executed by the processing apparatus 1001, the computer program executes the above-described functions limited in the methods according to the embodiments of the present disclosure.

It should be noted that the above-described computer-readable medium according to the present disclosure may be a computer-readable signal medium or a computer-readable storage medium, or any combination thereof. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage device; a magnetic storage device; or any suitable combination of the above. In the present disclosure, the computer-readable storage medium may be any tangible medium that contains or stores a program that may be used by or in conjunction with an instruction executing system, an apparatus, or a device. Rather, in the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

In some implementations, the client and the server may communicate with any network protocol currently known or to be researched and developed in the future such as Hyper-Text transfer protocol (HTTP), and may communicate (via a communication network) and interconnect with digital data in any form or medium. Examples of communication networks include a local area network ("LAN"), a wide area network ("WAN"), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the above-described one or more programs are executed by the electronic device, the electronic device: receives a co-shooting request input by a user based on a first video; turns on, in response to the co-shooting request, a video capture apparatus, and acquires a second video through the video capture apparatus; and fuses the first video with the second video to obtain a target video.

The computer program codes for executing the operations according to the present disclosure may be written in one or more programming languages or a combination thereof, the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium, which may contain or store programs for use by or in combination with an instruction execution system, an apparatus or a device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the above contents. A more specific example of the machine-readable storage medium may include an electrical connection based on one or more lines, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above contents.

According to one or more embodiments of the present disclosure, a video co-shooting method is provided. The video co-shooting method comprises:

receiving a co-shooting request input by a user based on a first video;

in response to the co-shooting request, turning on a video capture apparatus, and acquiring a second video through the video capture apparatus; and fusing the first video with the second video to obtain a target video, where a foreground of the target video comes from one of the first video and the second video, and a background of the target video comes from another of the first video and the second video.

Further, fusing the first video with the second video to obtain the target video comprises:

extracting a first target content of the first video, and fusing the first target content with the second video to obtain the target video; and/or extracting a second target content of the second video, and fusing the second target content with the first video to obtain the target video; and/or extracting a third target content of the first video, extracting a fourth target content of the second video, and fusing the third target content with the fourth target content to obtain the target video.

Further, extracting the first target content of the first video, and fusing the first target content with the second video, comprises:

in the case where the co-shooting request is a first co-shooting request, taking the first target content as the foreground of the target video, taking the second video as the background of the target video, and fusing the first target content with the second video.

Further, extracting the second target content of the second video, and fusing the second target content with the first video, comprises:

in the case where the co-shooting request is a second co-shooting request, taking the second target content as the foreground of the target video, taking the first video as the background of the target video, and fusing the second target content with the first video.

Further, the video co-shooting method further comprises:

turning on an audio capture apparatus based on the co-shooting request; and acquiring an audio captured by the audio capture apparatus, and taking the audio captured by the audio capture apparatus as background music of the target video.

Further, the video co-shooting method further comprises:

extracting an audio of the first video; and taking the audio of the first video as background music of the target video.

Further, the video co-shooting method further comprises:

receiving a background music adding request input by the user based on the target video;

presenting a background music adding interface in response to the background music adding request;

receiving an audio selection operation of the user based on the background music adding interface; and taking music corresponding to the audio selection operation as background music of the target video.

Further, the video co-shooting method further comprises:

receiving a video post request input by the user based on the target video;

determining a similarity between the target video and the first video in response to the video post request; and in the case where the similarity between the target video and the first video does not exceed a preset threshold, sending the target video to a server.

According to one or more embodiments of the present disclosure, a video co-shooting apparatus is provided. The video co-shooting apparatus comprises:

a co-shooting request receiving module, configured to receive a co-shooting request input by a user based on a first video;

a video acquiring module, configured to turn on, in response to the co-shooting request, a video capture apparatus, and acquire a second video through the video capture apparatus; and a video fusing module, configured to fuse the first video with the second video to obtain a target video, where a foreground of the target video comes from one of the first video and the second video, and a background of the target video comes from another of the first video and the second video.

Optionally, when fusing the first video with the second video, the video fusing module may be configured to:

extract a first target content of the first video, and fuse the first target content with the second video to obtain the target video; and/or extract a second target content of the second video, and fuse the second target content with the first video to obtain the target video; and/or extract a third target content of the first video, extract a fourth target content of the second video, and fuse the third target content with the fourth target content to obtain the target video.

Optionally, when extracting the first target content of the first video and fusing the first target content with the second video to obtain the target video, the video fusing module may be configured to:

use, when the co-shooting request is a first co-shooting request, the first target content as the foreground of the target video, and use the second video as the background of the target video, so as to fuse the first target content with the second video.

Optionally, when extracting the second target content of the second video and fusing the second target content with the first video to obtain the target video, the video fusing module provided by the embodiment of the present disclosure may be configured to:

use, when the co-shooting request is a second co-shooting request, the second target content as the foreground of the target video, and use the first video as the background of the target video, so as to fuse the second target content with the first video.

Optionally, the video fusing module may be further configured to:

turn on, based on the co-shooting request, an audio capture apparatus; and acquire an audio captured by the audio capture apparatus, and use the audio captured by the audio capture apparatus as background music of the target video.

Optionally, the video fusing module may be further configured to:

extract an audio of the first video; and use the audio of the first video as the background music of the target video.

Optionally, the video fusing module may be further configured to:

receive a background music adding request input by the user based on the target video;

present a background music adding interface in response to the background music adding request;

receive an audio selection operation of the user based on the background music adding interface; and use the music corresponding to the audio selection operation as the background music of the target video.

Optionally, the video co-shooting apparatus provided by the embodiments of the present disclosure further includes a video posting module, which is configured to:

receive a video post request input by the user based on the target video;

determine, in response to the video post request, the similarity between the target video and the first video; and send, when the similarity between the target video and the first video does not exceed a preset threshold, the target video to the server.

According to one or more embodiments of the present disclosure, an electronic device is provided. The electronic device comprises: one or more processors; a memory; and one or more application programs. The one or more application programs are stored in the memory and configured to be executed by the one or more processors, and the one or more application programs are configured to execute the video co-shooting method described above.

According to one or more embodiments of the present disclosure, a computer-readable medium is provided. The computer-readable medium stores at least one instruction, at least one program, a code set, or an instruction set; and the at least one instruction, the at least one program, the code set, or the instruction set is loaded and executed by a processor to implement the video co-shooting method described above.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced each other to form a technical solution.

Furthermore, although the respective operations are described in a particular order, this should not be understood as requiring the operations to be executed in the particular order shown or in a sequential order. Under certain circumstances, multitasking and parallel processing may be favorable. Similarly, although the above discussion contains a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

What is claimed is:

1. A video capturing method, comprising:
   receiving a capturing request to create a mixed video associated with a first video, wherein the first video is a video which is already uploaded and posted;
   in response to the capturing request, acquiring a second video; and
   obtaining a mixed video by mixing the first video and the second video, wherein a foreground of the mixed video is based on the first video, and a background of the mixed video is based on the second video,
   wherein the mixing of the first and second videos comprises:
   extracting the foreground of the mixed video from the first video, extracting the background of the mixed video from the second video, and mixing the foreground video and the background video.

2. The video capturing method according to claim 1, wherein acquiring the second video and mixing the first video with the second video concurrently.

3. The video capturing method according to claim 1, wherein mixing the first video with the second video after acquiring the second video.

4. The video capturing method according to claim 1, wherein acquiring the second video comprises: in response to the capturing request, turning on a video capture apparatus, and acquiring the second video through the video capture apparatus.

5. The video capturing method according to claim 1, further comprising:
   turning on an audio capture apparatus in response to the capturing request; and
   acquiring an audio captured by the audio capture apparatus, and taking the audio captured by the audio capture apparatus as background music of the mixed video.

6. The video capturing method according to claim 1, further comprising:
   extracting an audio of the first video; and
   taking the audio of the first video as background music of the mixed video.

7. The video capturing method according to claim 1, further comprising:
   receiving a background music adding request input by a user associated with the mixed video;
   presenting a background music adding interface in response to the background music adding request;
   receiving an audio selection operation of the user based on the background music adding interface; and
   taking music corresponding to the audio selection operation as background music of the mixed video.

8. The video capturing method according to claim 1, further comprising:
   receiving a video post request input by a user associated with the mixed video;
   determining a similarity between the mixed video and the first video in response to the video post request; and
   in response to determining that the similarity between the mixed video and the first video does not exceed a preset threshold, sending the mixed video to a server.

9. The video capturing method according to claim 1, wherein the mixing of the first and second videos comprises:
   extracting a first foreground of the mixed video from the first video, extracting a second foreground of mixed video from the second video, and mixing the first foreground video and the second foreground video as the foreground of the mixed video; or
   extracting a first background of the mixed video from the first video, extracting a second background of mixed video from the second video, and mixing the first background video and the second background video as the foreground of the mixed video.

10. A computer-readable medium, wherein the computer-readable medium stores at least one instruction, at least one program, a code set, or an instruction set; and the at least one instruction, the at least one program, the code set, or the instruction set is loaded and executed by a processor to implement the video capturing method according to claim 1.

11. A video capturing method, comprising:
   receiving a capturing request to create a mixed video associated with a first video, wherein the first video is a video which is already uploaded and posted;
   in response to the capturing request, acquiring a second video; and
   obtaining a mixed video by mixing the first video and the second video, wherein a foreground of the mixed video is based on the second video, and a background of the mixed video is based on the first video, wherein the mixing of the first and second videos comprises:

extracting the foreground of the mixed video from the second video, extracting the background of the mixed video from the first video, and mixing the foreground video and the background video.

12. The video capturing method according to claim 11, wherein acquiring the second video and mixing the first video with the second video concurrently.

13. The video capturing method according to claim 11, wherein mixing the first video with the second video after acquiring the second video.

14. The video capturing method according to claim 11, wherein acquiring the second video comprises: in response to the capturing request, turning on a video capture apparatus, and acquiring the second video through the video capture apparatus.

15. The video capturing method according to claim 11, further comprising:

turning on an audio capture apparatus in response to the capturing request; and acquiring an audio captured by the audio capture apparatus, and taking the audio captured by the audio capture apparatus as background music of the mixed video.

\* \* \* \* \*